United States Patent
Chen

(10) Patent No.: US 6,364,480 B1
(45) Date of Patent: Apr. 2, 2002

(54) NOSEPADS

(76) Inventor: Shih-Lang Chen, NO 84-3, Lane 702, An Chung Road, Sec. 1, Tainan City (TW)

( * ) Notice: Subject to any disclaimer, the term of this patent is extended or adjusted under 35 U.S.C. 154(b) by 0 days.

(21) Appl. No.: 09/908,071

(22) Filed: Jul. 18, 2001

(51) Int. Cl.⁷ .............................. G02C 5/12; G02C 1/00
(52) U.S. Cl. ........................... 351/138; 351/78; 351/80; 351/136
(58) Field of Search .................................. 381/138, 136, 381/137, 139, 78, 80, 65, 69, 70, 71, 72, 76, 79, 81, 41

(56) References Cited

U.S. PATENT DOCUMENTS 4,792,222 A * 12/1988 Labenz et al. ............... 351/136
5,581,312 A * 12/1996 Chen ........................... 351/138

* cited by examiner

*Primary Examiner*—Hung Xuan Dang
(74) *Attorney, Agent, or Firm*—Alan Kamrath; Rider, Bennett, Egan & Arundel, LLP

(57) ABSTRACT

A pair of nosepads each comprises a pad member having a cavity, and a peg extended downward from a bridge portion of a frame of the eyeglasses, the peg having a flexible bifurcate member inserted into the cavity for securing the pad member and the peg together. The nosepads are configured to laterally compress or expand as supported on nose of a wearer.

1 Claim, 3 Drawing Sheets

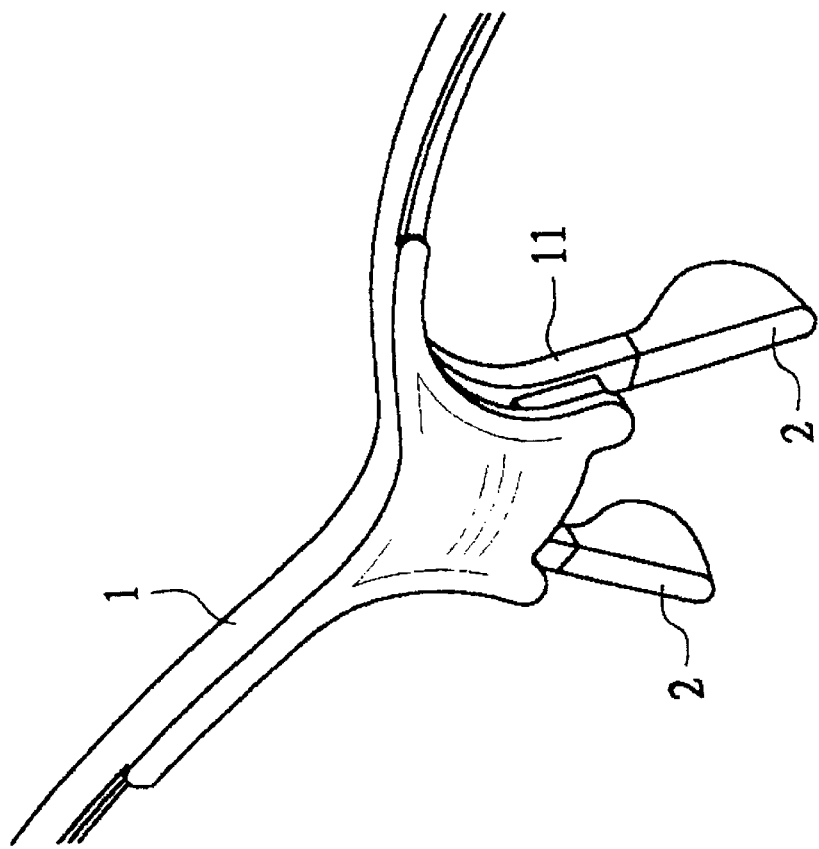
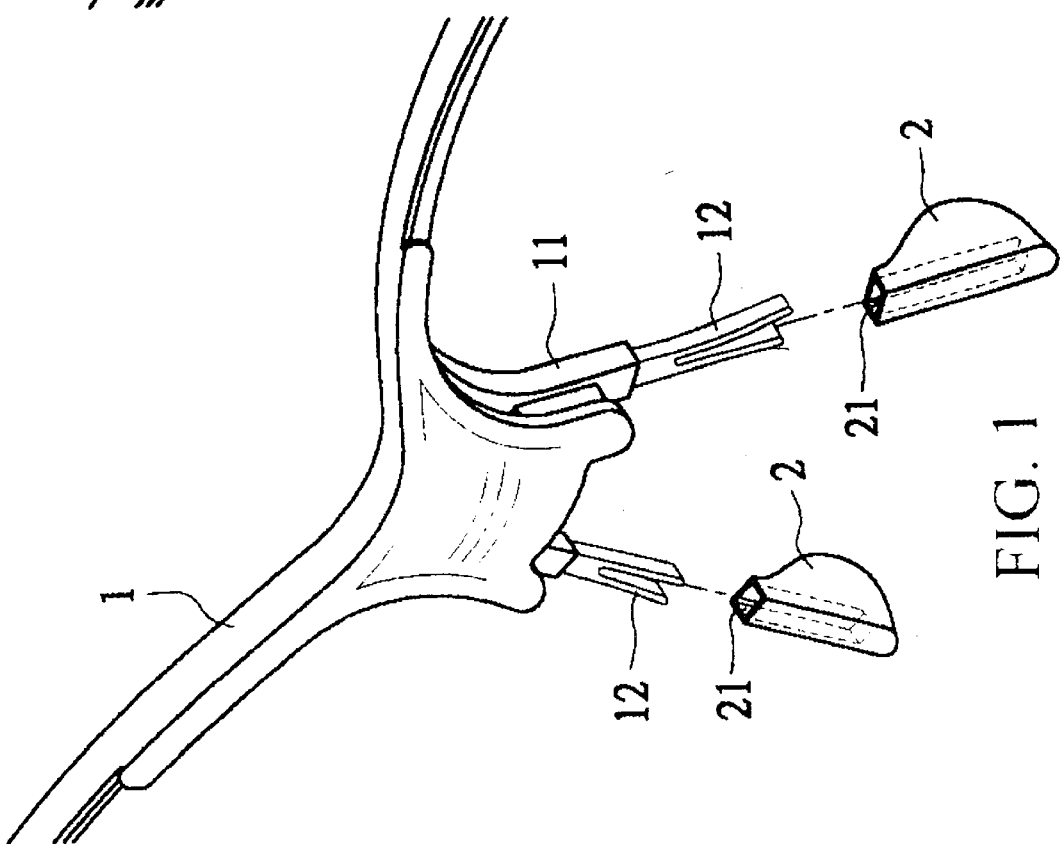
FIG. 1
FIG. 2

NOSEPADS

FIELD OF THE INVENTION

The present invention relates to nosepads of eyeglasses and more particularly to such nosepads with improved characteristics.

BACKGROUND OF THE INVENTION

Typically, a wearer of eyeglasses is often bothered by the dropped nosepads as times of use increases. Conventionally, there are two types of nosepad. One is integrally formed with frame while the other is releasably coupled to frame (i.e., for example by screws). Drawback of the former is that there is a trace left on dorsum of nose after a long period of time in contact between nose and nosepads. Drawback of the later is that the distance between two nosepads tends to increase. This is particularly true for narrow dorsum of nose. As a result, eyeglasses tends to lower while wearing. In response, wearer has to lift and adjust eyeglasses frequently.

Thus, it is desirable to provide an improved nosepad device in order to overcome the above drawbacks of prior art.

SUMMARY OF THE INVENTION

It is therefore an object of the present invention to provide a pair of nosepads mounted on eyeglasses, each nosepad comprising a pad member having a cavity; and a peg extended downward from a bridge portion of a frame of the eyeglasses, the peg having a flexible bifurcate member inserted into the cavity for securing the pad member and the peg together; wherein the nosepads are configured to laterally compress or expand as supported on nose of a wearer.

The above and other objects, features and advantages of the present invention will become apparent from the following detailed description taken with the accompanying drawings.

BRIEF DESCRIPTION OF THE DRAWINGS

FIG. 1 is an exploded view of a pair of nosepads according to the invention mounted on eyeglasses;

FIG. 2 is a perspective view of the FIG. 1 nosepads mounted on eyeglasses;

DETAILED DESCRIPTION OF THE PREFERRED EMBODIMENTS

Figure 4:
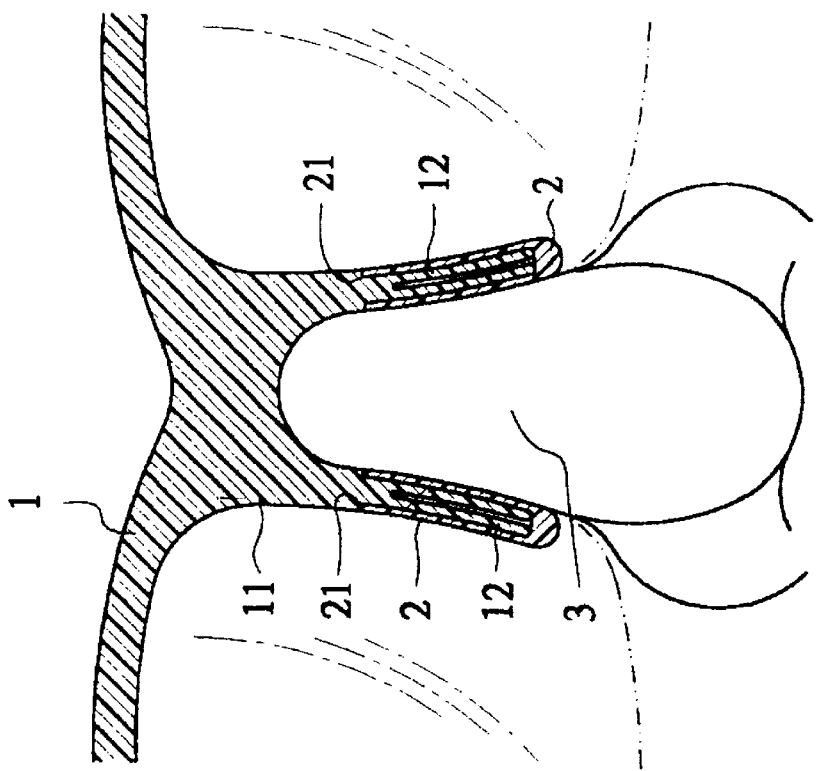
FIG. 4 is a view similar to FIG. 3 where the FIG. 1 eyeglasses is worn by another wearer having a wide dorsum of nose.

Referring to FIGS. 1 and 2, there is shown a pair of nosepads of eyeglasses in accordance with the invention. Each nosepad comprises a pad member 2 having a cavity 21, a peg 11 extended downward from bridge portion of frame 1, and a flexible bifurcate member 12. The width of the opening of bifurcate member 12 is larger than that of cavity 21 so that an expansion force is generated by bifurcate member 12 after bifurcate member 12 is inserted into cavity 12. This can secure pad member 2 to peg 11.

Figure 3:
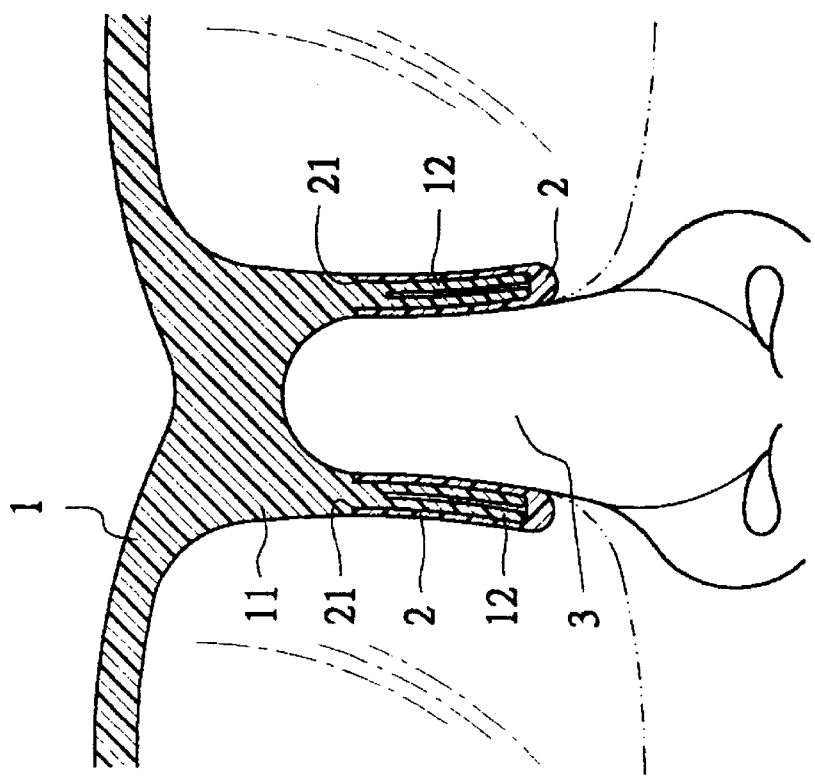
FIG. 3 is a front view of the FIG. 1 eyeglasses worn by a wearer having a narrow dorsum of nose.

Referring to FIG. 3, there is shown an eyeglasses incorporated the FIG. 1 nosepads worn by a wearer having a narrow dorsum of nose. In this position, nosepads may compress nose 3 tightly therebetween due to the inherent flexibility of bifurcate members 12.

Referring to FIG. 4, there is shown the eyeglasses incorporated the FIG. 1 nosepads worn by another wearer having a wide dorsum of nose. In this position, nosepads are expanded. But nosepads still can compress nose 3 tightly therebetween due to the compression of bifurcate members 12.

Figure 5:
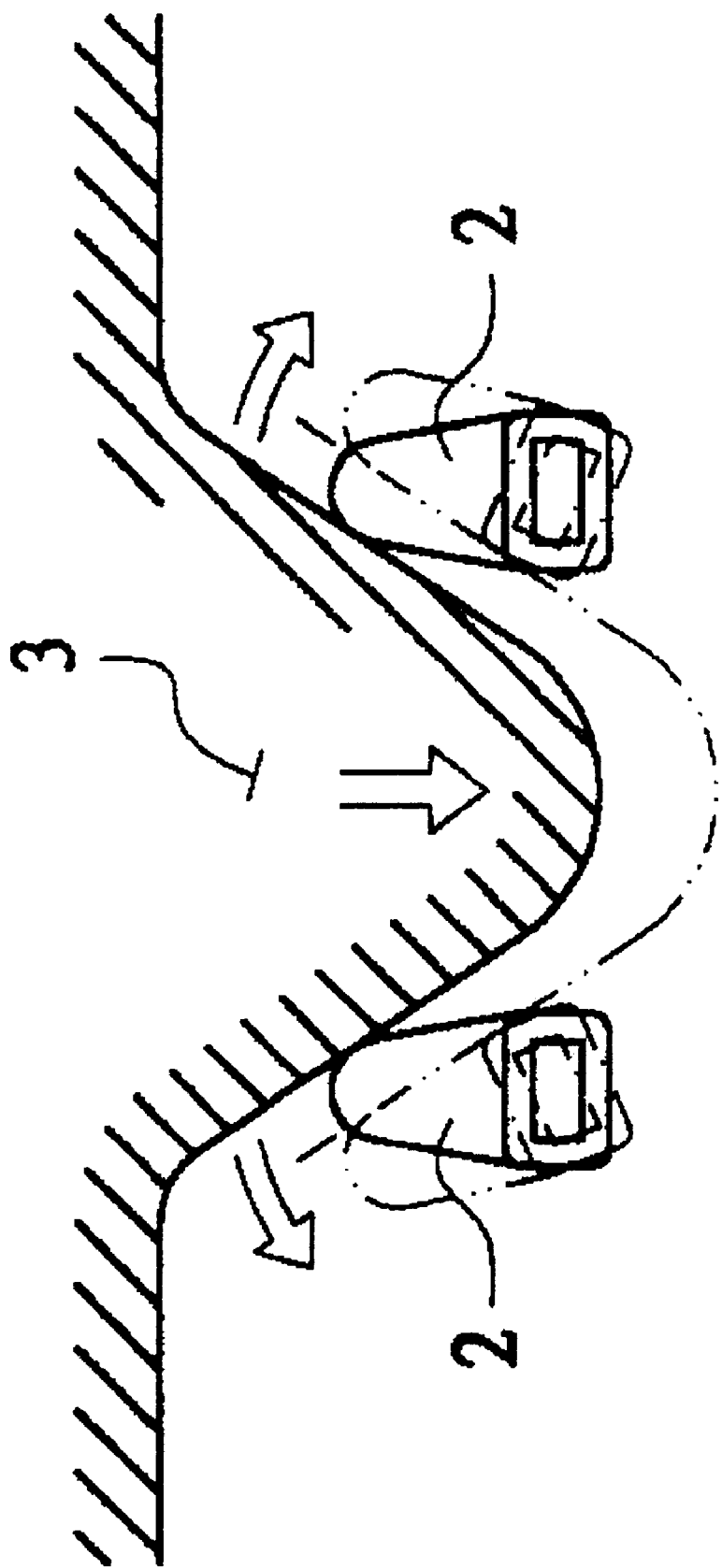
FIG. 5 is a cross-sectional view illustrating the stress distribution after wearing the FIG. 1 eyeglasses.

Referring to FIG. 5, the stress distribution after wearing the FIG. 1 eyeglasses is shown. It is seen that the compression or expansion of nosepads of the invention is adapted to the contour of dorsum of nose. As a result, eyeglasses is stably supported on dorsum of nose while the wearer still feels a degree of comfort.

While the invention has been described by means of specific embodiments, numerous modifications and variations could be made thereto by those skilled in the art without departing from the scope and spirit of the invention set forth in the claims.

What is claimed is:

1. A pair of nosepads mounted on an eyeglasses, each nosepad comprising:

a pad member having a cavity; and a peg extended downward from a bridge portion of a frame of the eyeglasses, the peg having a flexible bifurcate member inserted into the cavity for securing the pad member and the peg together;

wherein the nosepads are configured to laterally compress or expand as supported on nose of a wearer.

\* \* \* \* \*